United States Patent Office 3,659,009
Patented Apr. 25, 1972

3,659,009
ACID DYEABLE POLYMERIC AMINE/ALKYLENE HYDROCARBON-ACRYLIC ACID COPOLYMER MODIFIED POLYOLEFIN
Ronald W. Fuest, Kinnelon Borough, and Milton Farber, Verona, N.J., assignors to Uniroyal, Inc., New York, N.Y.
No Drawing. Filed Aug. 13, 1969, Ser. No. 849,896
Int. Cl. C08f 29/12; C08g 39/10, 41/04
U.S. Cl. 260—857 L       42 Claims

ABSTRACT OF THE DISCLOSURE

A fiber-forming composition comprising a blend of (A) a polyolefin or polyester, (B) an amine-containing polymer and (C) a copolymer of an alkylene hydrocarbon and acrylic or methacrylic acid or the salts thereof. The resultant products are dyeable with anionic and disperse dyes.

---

The present invention is directed to the production of dye-receptive melt extruded fibers, or shaped articles capable of being formed into fibers, from polyolefins or polyesters. More particularly, it is directed to a composition of matter including, as its major constituent, polypropylene, polyethylene or a polyester, which composition of matter may be melt extruded to form fibers or articles such as films and tapes capable of being formed into fibers, all of which are readily dyed by disperse or anionic dyes.

The composition of matter will be described herein mainly in terms of fibers and yarns (which can be either staple or continuous filament), but it is to be understood that other forms also may be produced such as monofilaments, or films and tapes which can subsequently be processed into fibers if desired.

Polyolefins and polyesters are well-known for being inherently undyeable due both to lack of polar sites in their molecular structures to which dye molecules may become attached, and to difficulty of penetration of dye molecules into their molecular structures. Processes for overcoming these defects have long been sought because good dyeability is a prerequisite for many commercial applications to which these polymers would be outstandingly suitable. For example, blends of polyolefins with minor amounts of anionic, cationic or nonionic modifiers have been used but the shaped articles made therefrom are dyeable to light shades only and the dark shades necessary for a commercially sealable product are difficult to obtain. The prior art suggests the use of combinations of the above-noted types of modifiers to impart dyeability to polyolefins and in some cases to polyesters. However, these disclosures are of such a vague and general nature that they provide no guide whatsoever for the actual preparation of commercially acceptable dyeable fibers.

Other techniques for making polyolefins dyeable have involved the addition of relatively large amounts of additive dye receptor, that is greater than five to ten percent by weight. Such techniques are impractical because these dye receptor additives are poorly dispersible in polyolefins, resulting in poor fiber properties and added expense.

Processes for rendering polyolefins and polyesters dyeable with acid type (anionic) dyes are described respectively in U.S. Pat. 3,361,843 and 3,432,250 to Robert Miller et al. The processes involve incorporating lesser amounts, generally between 0.5% and 10% of a highly basic polymer, for instance a polyvinylpyridine, into the inherently undyeable polymer before the polymer mixture is shaped into fibers. After being shaped, the fibers are made permeable to anionic, water-soluble dyes by acid after treatment. The latter step is termed "activation."

It is an object of this invention to provide polyolefin and polyester fibers which are dyeable with anionic dyes to deep shades with good fastness properties. It is a further object of this invention to provide fibers which may be dyed with anionic dyes without activation. It is another object to provide a process for making polyolefin or polyester fibers from blends of highly dispersed constituents, which blends are easy to prepare, are readily dyeable and possess good thermal and oxidative stability. Other objects and advantages of this invention will be apparent to those skilled in the art from a study of this specification.

The compositions of matter which are included in the present invention are comprised of (A) between about 90 and 98% by weight of fiber-forming polymer selected from an alpha-olefin polymer or a polyester, (B) between about 1% and 5% by weight of a polymeric amine dye receptor which is capable of fixing anionic dyes, and (C) between about 1% and 5% by weight of a copolymer of an alkylene aliphatic hydrocarbon and acrylic or methacrylic acid or salts thereof. All percentages listed herein for each component present in the fiber are given in percent by weight of the total composition.

The inherently undyeable alpha-olefin polymers comprise both homopolymers and copolymers of alpha-olefins, for example, copolymers with non-terminal olefins or with one or more other alpha-olefins, as well as block copolymers of alpha-olefins with each other and graft copolymers of alpha-olefins with polymers of other alpha-olefins. The class includes polyethylene, polypropylene, poly(3-methyl-1-butene), poly(4-methyl-1-pentene), copolymers of propylene and 3-methyl-1-butene, copolymers of propylene and copolymers of any of the foregoing monomers with each other and/or with other copolymerizable hydrocarbon monomers. The preferred material is polypropylene, by which we mean any polymer of propylene and any copolymer containing predominantly polymerized propylene together with any other monomer copolymerized therewith.

The term polyester refers to linear, fiber-forming polyesters. These polyesters include condensation polymers of dihydric alcohols with organo-dibasic acids and anhydrides thereof, particularly dicarboxylic acids, and self-condensation polymers of omega-hydroxy carboxylic acids. It should be understood that the invention is applicable to all film- and fiber-forming polyesters, in which the ester linkages are intralinear, including poly(alkylene alkanedioates), poly(cycloalkylenedimethylene alkanedioates), polyalkylene arenedioates), poly(cycloalkylenedimethylene arenedioates), and analogous materials. Examples of some of the above-named types of polyesters are poly(ethylene adipate), poly(1,4-cyclohexylenedimethylene adipate), poly(ethylene terephthalate) poly (ethylene isophthalate, poly(co-ethylene terephthalate-isophthalate) and poly(1,4 - cyclohexylenedimethylene terephthalate).

The dye receptor compounds, (B), are thermoplastic, thermostable, alkyl or aralkyl amine-containing polymers having at least about 0.5% available amine nitrogen atoms and having a basic ionization constant ($K_b$) value between about $10^{-3}$ and $10^{-6}$. The nitrogen-containing moiety of these polymers may be either extra-or intra-linear, and may be part of a cyclic or acyclic grouping. Aromatic and heteroaromatic amines however, such as anilines, pyridines and quinolines are not included. The polymers used can be made by any polymerization process, i.e. chain growth (addition) or step growth (condensation, etc.) Another factor of importance equal to that of the actual basic ionization constant is the affinity of the basic polymers for dyestuffs, i.e. the ability to form some type of bond, either specific or non-specific, with the dyes.

It is understood that the basic nitrogen polymers blended with the polyolefins or polyesters in accordance with the present invention should not be excessively leachable from the shaped object during the dyeing process. Thus, dye receptors such as low molecular weight fatty amines are leachable to an undesirable extent and tend to migrate from the shaped object into the dyebath and are of no use in binding the dye in the fiber. The presence of leached dye receptor in the dyebath is highly undesirable since in many cases it forms complexes with the dye, thus making the dye unavailable for dying the fiber. In addition, these complexes are frequently insoluble in the dyebath and cause unsightly blotches on the shaped object.

Suitable dye receptor compounds, (B), are exemplified by thermoplastic polymeric amine compounds, including condensation polymers in which the amine group is an integral part of, or pendant from the polymer chain, as well as addition homopolymers and copolymers wherein pendant groups include or consist of amine groups. Examples of polymeric amine compounds particularly useful in this invention are the reaction products of ethylene-maleic anhydride or styrene-maleic anhydride copolymers with an omega-(dialkylamino)alkylamine (wherein the alkyl groups contain from 1 to 5 carbon atoms), the product being an aminoimide [the preparation of such materials has been described by Cohen and Minsk, J. Org. Chem. 24, 1404, (1959)]; the reaction product of N-methyl-bis(aminopropyl)amine with 2,4-tolylene diisocyanate, the product being a poly(aminourea); the reaction products of N-methyl-bis(3 - aminopropyl)amine with dicarboxylic acids ($C_4$ to $C_{12}$), the products being poly(aminoamides); the copolymers of ethylene or styrene with mono- or dialkyl ($C_1$ to $C_5$)aminoalkyl -($C_1$ to $C_5$)-acrylates or methacrylates; and water-insoluble derivatives of polyethyleneimine.

The water insoluble derivatives of polyethyleneimine are the reaction products of an alkylbenzyl halide and polyethyleneimine wherein the alkyl group contains from 6 to 20 carbon atoms, preferably from 8 to 12 carbon atoms. The degree of substitution upon the nitrogen atoms can vary from 15 to 100%, depending upon the size of the alkyl group and the final nitrogen percentage desired. The alkyl group can be a straight chain, branched or cyclic hydrocarbon.

The structural formula of those repeating units of polyethyleneimine which are substituted with the alkylbenzyl group is:

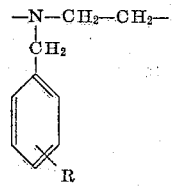

wherein R represents an alkyl group having from six to twenty carbon atoms.

Although the invention is applicable in the range of 1% to 5% content of nitrogen-base polymer in the fiber, it is preferred to employ the range of 2 to 4%, the particular value depending generally upon the nitrogen content and relative basicity of the amine-containing polymer. The latter range is advantageous because of the high cost of nitrogen-base polymers and because it minimizes any undesirable effects on the physical properties and whiteness of the fiber. The presence of 0.5 to 5% of basic nitrogen polymer in the fiber is usually sufficient to exhaust a 1% (OWF) (on the weight of the fiber) dye bath, which gives deep colors with many dyes. The higher levels of basic nitrogen-containing polymer content permit absorption of much greater (up to 10% OWF) amounts of dye by the fiber when desired. As noted above, it has been found that, in some cases in the practice of this invention, it is possible to obtain excellent dyability with as little as 0.05% of basic nitrogen (based on total weight) in the fiber although up to 1.5% nitrogen may be used.

An essential feature of the present invention is the discovery of certain compounds which act as the (C) ingredient and in combination with the (B) ingredient render the shaped articles intensely dyeable. Although without the (C) component the amount of basic nitrogen dye receptor in the (A) and (B) combination is stoichiometrically sufficient to bind the amounts of dye desired, it is found in practice that said (A) and (B) combination dyes at best only to pale shades.

The (C) component of the present composition is a copolymer of an alkylene compound such as ethylene, propylene, or butylene and acrylic or methacrylic acid. The acid portion of the polymer may be in free acid form, partially converted to salt or fully converted to salt. Any of the monovalent or divalent metals of groups I and II of the Periodic Table can be used to form the cation of the salt in the copolymer. However, the monovalent metals such as sodium or potassium are preferred to divalent metals such as zinc because the monovalent metals yield fibers with better physical properties. The acid portion of the copolymer is preferably about 5% to 20% by weight of the copolymer.

In order to obtain a product which is dyeable with anionic or disperse dyes to acceptable commercial standards, the (C) component should be present in the blend in the range of about 1% to 5%, preferably between about 2% and 4%. The molecular weight range of said component can be between about 50,000 and 1,000,000. Although the molecular weight of the (C) component is not critical, it is usually desirable for best processability and physical properties of the shaped article or fiber to have the melt indices of the (A) and (C) components approximately the same.

In order for a fiber to possess dyeability of commercial quality, it must be dyeable to deep shades. The mere improvement in dyeability from no dyeability to the ability to attain light shades is wholly insufficient to constitute commercially acceptable dyeability. The present invention produces dyeability to dark shades as well as light shades, using conventional anionic or disperse dyes and conventional dyeing techniques.

The method used to form the blend is not critical provided the polymers of the present invention are homogenerously dispersed throughout the polyolefin or polyester. Incomplete mixing results in the formation of aggregates which impair the physical properties of the blend. The blend may be formed by mixing the three polymers in granular or powder form in a mixing apparatus followed by extrusion. In general, when forming the mixture by extrusion, the polymers, in granular or powder form, are first mixed by tumbling. A fine powder is preferred as this increases the degree of homogeneity. The mixture of polymers then is extruded at a temperature ranging between 450° and 550° F. In order to insure complete dispersion, it is frequently desirable to pelletize the extruded strand in a strand chopper and re-extrude to form the desired product.

To insure optimum dispersion, the (B) and (C) components may be pre-blended either by tumbling, milling or extruding followed by pelletizing, prior to mixing with the polyolefin or polyester (A) component. Melt spinning and drawing of the resultant fiber can be done using any suitable apparatus.

The fiber may be scoured if desired, and dyed by immersion in a dye bath. It is a feature of the present composition of matter that it may be dyed by many types of dyes. Dyes particularly suitable for use with this invention are the acid dyes, i.e., those in which the color bodies are anionic. This includes a number of catagories of dyes, one of which is the strong acid dyes, typified by the following:

Acid Blue 80 (C.I. No. 61585)
Acid Yellow 23 (C.I. No. 19140)
Acid Orange 7 (C.I. No. 15510)
Acid Red 73 (C.I. No. 27290)
Acid Blue 45 (C.I. No. 63010)
Acid Blue 78 (C.I. No. 62105)
Acid Blue 62 (C.I. No. 62045)

Another category of anionic dyes is the acid metallized dyes, typified by:

Acid Yellow 54 (C.I. No. 19010)
Acid Orange 72 (C.I. No. 18740)
Acid Red 186 (C.I. No. 18810)
Acid Blue 158 (C.I. No. 14880)
Acid Red 212

Still another category of anionic dyes is the neutral metallized dyes typified by the following:

Acid Yellow 121 (C.I. No. 18690)
Acid Orange 60 (The half-chrome complex of 1-phenyl-3-methyl - 4-(2-hydroxy-5-sulfamoyl phenylazo)-5-pyrazolone)
Acid Red 209
Acid Blue 168

Still another category of anionic dyes is the direect dyes, typified by the following:

Direct Yellow 44 (C.I. No. 29000)
Direct Red 13 (C.I. No. 22155)
Direct Blue 67 (C.I. No. 27925)

Other categories of anionic dyes which are applicable to our invention are the reactive dyes, typified by Reactive Orange 1, and the mordant acid dyes, typified by Mordant Red 3 (C.I. No. 58005).

The products are also highly dyeable with disperse dyes, typified by Disperse Yellow 23 (C.I. No. 26070), Disperse Blue 1 (C.I. No. 64500) and Disperse Red 13 (C.I. No. 11115).

In order to disclose more clearly the nature of the present invention, specific examples of the practice of the invention are hereinafter given. It should be understood, however, that this is done solely by way of example and is intended neither to delineate the scope of the invention nor limit the ambit of the appended claims.

The term "phr." means parts per hundred of the resin."

In order to illustrate more concretely the great improvement in dyeability brought about by the combination of amine-containing polymer dye receptor and alkylene-acrylic acid copolymer in polyolefin and polyester fiber, the color intensities of same samples were instrumentally measured in comparison with controls containing no alkylene-acrylic acid copolymer.

For this purpose, dyed fibers were ground in a Wiley mill to pass a No. 40 screen, compressed at 78 p.s.i., and their reflectances measured in a Model D-1 Color-Eye Colorimeter (manufactured by Instrument Development Laboratories, Inc., Attleboro, Mass.). The measurement was made with a Y tristimulus filter and the reflectances corrected to C.I.E. values.

Since reflectance decreases as color intensity increases, the corrected readings were converted by means of their reciprocals to an I value which is directly proportional to color intensity, by the following formula:

$$I = \frac{1}{C.I.E. \text{ reflectance } (Y)} \times 1,000$$

These values are listed in the examples. C.I.E. is an abbreviation of Commission Internationale d'Eclairage (International Committee on Illumination).

EXAMPLE I

A blend of 100 grams of a 1:1 mole ratio styrene-dimethylaminopropylamaleimide copolymer [Cohen and Minsk, J. Org. Chem. 24, 1404 (1959)], and 100 grams of a copolymer of 87 weight percent ethylene and 13 weight percent methacrylic acid wherein approximately 50% of the carboxyl groups were in the sodium salt form (Surlyn A ER1552, DuPont) was prepared by milling the two polymers together on a two-roll mill at 210–220° F. for 3 minutes. The resultant blend, after cooling, was ground to pass a ¼″ screen.

Twenty-four grams of this blend were mixed with 400 grams of fiber-grade polypropylene containing heat stabilizer (Pro-fax 6623 Hercules). The mixture was tumbled to mix the two constituents thoroughly, fed to a 1″ extruder and extruded into a ⅛″ rod at 500° F. The rod was then chopped into pellets, and dried in a vacuum oven at 185° F. for 18 hours.

The pellets were then melt-extruded into an 8 filament yarn at 535° F. using a conventional melt-spinning apparatus. The resultant yarn was drawn 2.5:1 at 275° F. to yield a drawn yarn of 25 denier/filament. The tenacity of the yarn was Ca. 2–3 grams/denier and its elongation at break was ca. 80%.

Skeins of the drawn yarn were dyed by a conventional procedure as follows: they were pre-scoured for 20 minutes with a small amount of nonionic surfactant such as Triton X–100 (a condensate of octylphenol with 9–10 moles of ethylene oxide) at a pH of 9 to 10 at 200° F. using a bath to fiber ratio of about 100 to 1. They were then dyed with 3% OWF dye at 200–210° F. for one hour in a dye bath acidified with 9% OWF of either acetic acid or formic acid and containing a small amount of nonionic detergent, using a bath to fiber ratio of 90 to 1. After dyeing, the skeins were post-scoured for 10 minutes at 160° F. in a bath containing a small amount of nonionic surfactant, at a bath to fiber ratio of about 100 to 1.

Using the dyeing procedure described above, deep bright colors were obtained with 3% OWF concentrations of the following dyes:

Acid organe 60 (the half chrome complex of 1-phenyl-3-methyl-4-(2-hydroxy-5-sulfamoyl phenylazo)-5-pyrazolone)
Acid Yellow 121 (C.I. No. 18690)
Acid Blue 158 (C.I. No. 14880)
Acid Blue 45 (C.I. No. 63010)
Disperse Yellow 23 (C.I. No. 26070)
Disperse Orange 21

Similar yarns, spun from blends containing no poly(co-ethylene-methacrylic acid) partial sodium salt had a coarse grainy appearance and yielded pale or light colors when dyed with the same dyes in the same manner.

EXAMPLE 2

Mixtures of polypropylene (melt index 6) with various amounts of the styrene-dimethylaminopropylmaleimide copolyethylene-methacrylic acid copolymer combination, prepared as described in Example 1 were blended and melt-spun into fiber by the technique used in Example 1. The fiber, after being drawn 2.5:1 was made into skeins, and the skeins pre-scoured, dyed and post-scoured according to the procedure described in Example 1. The dyes used were:

(A) 3% OWF Acid Blue 78 with 9% OWF acetic acid
(B) 3% OWF Acid Orange 60 with 9% OWF formic acid The color intensities obtained with these dyings are listed in Table I. In addition to visual ratings, the intensities were measured instrumentally, using the reflectance technique described above.

The abbreviations used in the table are:

Phr.=parts per hundred (by weight) added to the polypropylene resin.
L=light
D=dark
M=medium
V=very
SAM=1:1 styrene - dimethylaminopropylmaleimide copolymer
EMAA=ethylene-13% methacrylic acid copolymer, half sodium salt

TABLE I

| Amount SAM (phr.) | Amount EMAA (phr.) | Dye (A) Visual | Dye (A) I value | Dye (B) Visual | Dye (B) I value |
|---|---|---|---|---|---|
| 5 | 0 | VL | 24.7 | VL | |
| 2 | 0 | VL | 37.0 | VL | 40.9 |
| 5 | 5 | VD | 280.0 | VD | 107.0 |
| 3 | 3 | D | 132.0 | D | 97.3 |
| 2 | 4 | L-M | 66.7 | M-D | 85.0 |
| 2 | 2 | | | M-D | 83.0 |

EXAMPLE 3

Blends of the ethylene-methacrylic acid copolymer used in Example 1 with various amounts of an ethylene-30% dimethylaminoethylmethacrylate copolymer (Du Pont PB-7007 resin) were milled at 210-220° F., granulated to pass a ¼" screen and dried in vacuo at 140° F. Amounts of these blends sufficient to give the concentrations of each of the above components as listed in Table II were tumbled with polypropylene pellets and converted to fiber by the technique described in Example 1. Skeins of this fiber were then pre-scoured, dyed and post-scoured according to the procedure of Example 1, using the following dye baths:

(A) 3% OWF Acid Blue 78 with 15% OWF sulfuric acid
(B) 3% OWF Acid Orange 60 with 9% OWF formic acid The color intensities obtained with these dyeings are listed in Table II. In addition to visual estimations, the intensities of some of the samples were measured instrumentally, using the reflectance technique described above. The abbreviations used in the table are:

L=Light
D=dark
M=medium
V=very
DAMA=ethylene-30% dimethylaminoethylmethacrylate copolymer
EMAA=ethylene-13% methacrylic acid copolymer, half sodium salt.

TABLE II

| Amount DAMA (phr.) | Amount EMAA (phr.) | Dye (A) Vsiual | Dye (A) I value | Dye (B) Visual | Dye (B) I value |
|---|---|---|---|---|---|
| 5 | 0 | L-M | 92.3 | L | 65.6 |
| 3 | 0 | L | | VL | |
| 5 | 2 | M | | D | |
| 5 | 4 | M-D | 120.0 | D | 87.6 |

EXAMPLE 4

An 8-filament polypropylene yarn containing 3 phr. of a 1:1 styrene-diethylaminoethylmaleimide copolymer and 3 phr. of a copolymer of 94 weight ethylene and 6 weight percent acrylic acid in which half of the carboxyl groups were in the sodium salt form (Surlyn AER170-; DuPont) was prepared by the method described in Example 1. The yarn was drawn 2.5:1, and dyed with 3% OWF of the following dyes:

Acid Orange 60
Acid Yellow 121
Acid Blue 45

Deep bright shades were obtained in each case. A similar fiber, not containing the above ethylene-acrylic acid copolymer, dyed only to pale muddy shades.

EXAMPLE 5

A polyurea containing tertiary amine groups in the main chain was prepared by reaction of N-methyl bis(3-aminopropylamine) with 2,4-tolylene diisocyanate in dimethyl formamide. The product was isolated by precipitation in water, washed with water, filtered and dried. It was a white powder which softened at 300-320° F. and appeared to melt at about 360-375° F.

Two blends containing 3 parts of the above polyurea and 100 parts polypropylene were then made up, one containing no other additives, the other containing 4 parts of the ethylene-methacrylic acid copolymer used in Example 1 in addition to the polyurea and polypropylene. The blends were tumbled, extruded at 550° F. through a ³⁄₁₆" round hole die and the resultant strand chopped into ⅛" pellets. After drying, the pellets were melt-spun into fiber at 550° F. by the procedure described in Example 1 and the fibers drawn 2.5:1.

Skeins of the two fibers were dyed with Acid Blue 78 and Acid Orange 60, as in Example 2. The fibers containing polyurea with no other additive were of poor quality and dyed to very pale colors. Those containing the combination of polyurea and ethylene-methacrylic acid copolymer were of good quality and dyed to deep, intense colors. Good dyeings could be obtained with fiber containing as little as 1 part of polyurea and 1 part of ethylene-methacrylic acid copolymer.

EXAMPLES 6

The full sodium salt of the ethylene-methacrylic acid copolymer used in Example 1 was prepared by milling said copolymer at 220° F. with the stoichiometric amount of powdered sodium hydroxide required to convert it from the half to the full sodium salt. The product was then granulated to pass a ¼" screen and dried in vacuo. Blends of 4 parts of this material with 3 parts and with 4 parts of the styrene-dimethylaminopropylmaleimide copolymer used in Example 1 were each made up with 100 parts of polypropylene. These were then extruder-compounded, melt-spun into fiber by the procedure used in Example 1, and the resultant fibers drawn 2.5:1.

Skeins of this fiber could then be dyed with the same dyes as those used in Example 2 to deep blue and deep red-orange colors.

EXAMPLE 7

Two 8-filament polypropylene yarns, containing the additives described below, were prepared by the method of Example 1.

Yarn A: 4 phr. styrene-dimethylaminopropylmaleimide copolymer and 4 phr. 94 weight percent ethylene- 6 weight percent methacrylic acid copolymer half-sodium salt.
Yarn B: 4 phr. styrene-dimethylaminopropylmaleimide copolymer and 4 phr. 80 weight percent ethylene- 20 weight percent methacrylic acid copolymer half-sodium salt.

Skeins of both yarns are dyeable to deep shades with the following dyes:

Acid Blue 45
Acid Red 186
Acid Yellow 121
Acid Blue 78

EXAMPLE 8

A blend of 4 parts of the copolymer of ethylene with 20 weight percent methacrylic acid half-zinc salt and 4 parts of the styrene-dimethylaminopropylmaleimide copolymer used in Example 1 were co-milled, granulated to pass a ¼" screen, and dried in vacuo. Eight parts of this blend were then extruder-compounded with 100 parts polypropylene and melt spun into fiber by the procedure of Example 1. The fiber was then drawn 2.5:1 at 275° F.

Skeins of this fiber were dyed with the dyebaths described in Example 2 and their color intensities measured both visually and instrumentally by the procedure in Example 2. The dyed fibers were rated very dark with both dyes and the samples showed the following I values:

Dye (A): 116
Dye (B): 114

Similar fibers containing only 4 phr. of styrene-dimethyl aminopropylmalimide copolymer in the polypropylene gave I values with both dyes below 40.

Intense colors are also obtained when the half salt of the ethylene-methacrylic acid copolymer is either potassium or calcium.

EXAMPLE 9

U.S. Pat. 3,373,224, to Mesrobian et al., discloses compositions containing polyamides, polyolefin and ethylene-$\alpha,\beta$-unsaturated acid copolymers neutralized with sodium ions.

This example illustrates that such compositions, either with or without the ethylene-$\alpha,\beta$-unsaturated acid copolymers neutralized with sodium ions are not dyeable with anionic dyes.

Blends of various amounts of nylon 6 (polycaprolactam, Du Pont) with the ethylene-methacrylic acid copolymer used in Example 1 were co-milled, granulated to pass a ¼" screen, and dried in vacuo at 140–150° F. Amounts of these blends sufficient to give the concentrations of the two components as listed in Table III were extruder-compounded with polypropylene and meltspun into fiber by the procedure described in Example 1. The fiber was then drawn 2.5:1 at 275° F.

Skeins of these fibers were dyed with the two dye baths described in Example 2, and their color intensities estimated both visually and instrumentally by the procedure outlined in Example 2. The results are listed in Table III below.

The abbreviations used in the table have the following meanings:

VL=Very Light
EMAA=ethylene-methacrylic acid copolymer half-sodium salt.

TABLE III

| | | Color intensity | | | |
| | | Dye (A) | | Dye (B) | |
| Nylon 6 (phr). | EMAA (phr). | Visual | I value | Visual | I value |
|---|---|---|---|---|---|
| 5 | 0 | VL | ------ | VL | 23.5 |
| 2 | 0 | VL | ------ | VL | 20.8 |
| 2 | 2 | VL | ------ | VL | 20.5 |
| 2 | 4 | VL | ------ | VL | 20.2 |
| 5 | 2 | VL | ------ | VL | 21.8 |
| 5 | 5 | VL | ------ | VL | 23.6 |

EXAMPLE 10

Two 8-filament polypropylene yarns were prepared by the method described in Example 1 and designated as fibers A and B. Fiber A contained 3 phr. of poly(2-vinylpyridine) (prepared by suspension polymerization using azo-bis-isobutyronitrile as initiator) and fiber B contained 3 phr. of poly(2-vinylpyridine) and 3 phr. of the copolymer of 87 weight percent ethylene and 13 weight percent methacrylic acid half-sodium salt. The fibers were dyed by the method described in Example 1 with the following dyes:

Acid Orange 60
Acid Blue 45
Acid Yellow 121

In all cases fibers A and B absorbed virtually no dye and were only slightly tinted. This illustrates the inapplicability of pyridinic nitrogen-containing polymers to the practice of this invention.

EXAMPLE 11

Blends of 4 parts of the styrene-dimethylaminopropylmaleimide copolymer used in Example 1 with 4 parts of a copolymer of ethylene and 3 weight percent acrylic acid and with 4 parts of the copolymer of ethylene and 15 weight percent acrylic acid (Union Carbide Resins DXQD–3103 and DXQD–3159 respectively) were milled, granulated to pass a ¼" screen and dried in vacuo. Eight parts of the two blends were extruder-compounded, each with 100 parts of polypropylene (to give 4 phr. of each component in the final blend) and melt-spun into fiber, by the procedure of Example 1. The fiber was then drawn 2.5/1 at 275° F.

Skeins of these fibers were then dyed with the dye baths described in Example 2. The fiber containing the copolymer of ethylene and 3% acrylic acid yielded very light or virtually no dyeing, whereas the one containing the copolymer of ethylene and 15% acrylic acid dyed to deep intense colors.

EXAMPLE 12

Copolymers of styrene with 3, 6, 9, 13 and 25 mol percent methacrylic acid were prepare via emulsion polymerization using the following recipe:

AQUEOUS PHASE

| | G. |
|---|---|
| Water | 99 |
| Sodium alkylbenzene sulfonate (Nacconal NRSF, Allied Chemical) | 1 |
| Trisodium salt of ethylenediamine tetraacetic acid | 0.005 |
| Ferrous sulfate heptahydrate | 0.001 |
| Sodium formaldehyde sulfoxylate | 0.025 |

ORGANIC PHASE

Monomers (1 part to 3 parts aqueous phase)

| | G. per 100 g. aqueous phase |
|---|---|
| Mixed tertiary mercaptans | 0.008 |
| Phenylcyclohexylhydroperoxide | 0.017 |

The mercaptan and hydroperoxide were added immediately prior to polymerization and the reaction was run for 48 hours at 120° F. under nitrogen. The emulsions were flocculated by pouring them into about 7 volumes of 5% aqueous calcium chloride solution, and the product filtered and dried. The products were purified by dissolving them in dimethylformamide and precipitating in excess methanol, after which they were filtered and dried.

Blends of equal parts of the above copolymers with the styrene-dimethylaminopropylmaleimide copolymer used in Example 1 were co-milled at 210°–220° F., granulated to pass a ¼" screen and dried in vacuo at 140° F. Four-gram portions of these blends were then extruder-compounded with 100 g. portion of polypropylene and melt-spun into fiber by the procedure of Example 1. Skeins of this fiber, when dyed with the dyes of Example 2 showed little or no coloration, illustrating the unique chemical nature of the (C) component in the present invention.

EXAMPLE 13

Twenty grams of the 1:1 blend of styrene-dimethylaminopropylmaleimide copolymer with the ethylene-methacrylic acid copolymer described in Example 1 were tumbled with 500 g. of polyethylene terephthalate (Vitel 316, Goodyear) and then melt-spun into 8-filament yarn at 540° F. The resultant yarn, which was drawn 2.5:1 over a pin (160° F.) and shoe (225° F.) thus contained 2 phr. of the two additives. A similar yarn containing no ethylene-methacrylic acid copolymer was prepared from a blend of 10 g. of styrene-dimethylaminopropyl-maleimide copolymer with 500 g. of polyethylene terephthalate. When skeins of thes yarns were dyed using the dyes described in Example 2, only pale colors were obtained with the yarn containing no ethylene-methacrylic acid copolymer, whereas medium blue and reddish orange colors were yielded by the yarns containing both constituents.

Having thus described our invention, what we claim and desire to protect by Letters Patent is:

1. A fiber-forming composition of matter which is dyeable with anionic dyes without pretreatment comprising
   (A) between about 90% and 98% of an alpha-olefin polymer;
   (B) between about 1% and 5% of a thermoplastic, thermostable, extra- or intraliner polymeric alkyl or aralkyl amine having at least about 0.5% available amine nitrogen atoms and a $K_b$ value between $10^{-3}$ and $10^{-6}$, said amine-containing polymer being capable of binding anionic and disperse dyes;
   (C) and between about 1% and 5% of a copolymer formed from an alkylene compound having between about 1 and 5 carbon atoms and acrylic or methacrylic acid or salts thereof, said copolymer having a molecular weight ranging between about 50,000 and 1,000,000 and a melt index between about 0.5 and 20.

2. A melt extruded fiber, or film which is capable of being formed into a fiber, having the composition defined in claim 1.

3. The article defined in claim 2 wherein said alpha-olefin polymer is selected from the group consisting of polyethylene, polypropylene, poly(3-methyl-1-butene), poly 4-methyl-1-pentene), and the copolymer of propylene and 3-methyl-1-butene.

4. The article defined in claim 2 wherein (B) is selected from the group consisting of
   (a) the reaction products of ethylene-maleic anhydride copolymer with an omega-(dialkylamino)alkyl amine wherein the alkyl groups contain 1 to 5 carbon atoms;
   (b) the reaction products of styrene-maleic anhydride copolymer with an omega-(dialkylamino)alkylamine wherein the alkyl groups contain 1 to 5 carbon atoms;
   (c) the reaction products of N-methyl-bis-(aminopropylamine) with 2,4-tolylene diisocyanate;
   (d) the reaction products of N-methyl-bis-(aminopropylamine) with dicarboxylic acids having 4 to 12 carbon atoms;
   (e) the copolymers of ethylene and a mono- or dialkylaminoalkyl acrylate wherein the alkyl groups contain 1 to 5 carbon atoms;
   (f) the copolymers of styrene and a mono- or dialkylaminoalkyl acrylate wherein the alkyl groups contain 1 to 5 carbon atoms;
   (g) the copolymers of ethylene and a mono- or dialkylaminoalkyl methacrylate wherein the alkyl groups contain 1 to 5 carbon atoms;
   (h) the copolymers of styrene and a mono- or dialkylaminoalkyl methacrylate wherein the alkyl groups contain 1 to 5 carbon atoms;
   (i) water insoluble alkylbenzyl adducts of polyethyleneimine wherein the alkyl groups contain 6 to 20 carbon atoms.

5. The article defined in claim 2 wherein (C) is selected from the group consisting of:
   (a) copolymers of ethylene and between 5 and 20 weight percent acrylic acid;
   (b) copolymers of ethylene and between 5 and 20 weight percent methacrylic acid;
   (c) copolymers of ethylene and between 5 and 20 weight percent acrylic acid wherein the acid portion of said copolymer is fully or partially converted to a salt, the cation of said acid salt being a mono- or divalent metal from Group I or II of the Periodic Table;
   (d) copolymers of ethylene and between 5 and 20 weight percent methacrylic acid wherein the acid portion of said copolymer is fully or partially converted to a salt, the cation of said acid salt being a mono-or divalent metal from Group I or II of the Periodic Table.

6. The article defined in claim 3 wherein (B) is selected from the group consisting of
   (a) the reaction products of ethylene-maleic anhydride copolymer with an omega-(dialkylamino)alkylamine wherein the alkyl groups contain 1 to 5 carbon atoms;
   (b) the reaction products of styrene-maleic anhydride copolymer with an omega-(dialkylamino)alkylamine wherein the alkyl groups contain 1 to 5 carbon atoms;
   (c) the reaction products of N-methyl-bis-(aminopropylamine) with 2,4-tolylene diisocyanate;
   (d) the reaction products of N-methyl-bis-(aminopropylamine) with dicarboxylic acids having 4 to 12 carbon atoms;
   (e) the copolymers of ethylene and a mono- or dialkylaminoalkyl acrylate wherein the alkyl groups contain 1 to 5 carbon atoms;
   (f) the copolymers of styrene and a mono- or dialkylaminoalkyl acrylate wherein the alkyl groups contain 1 to 5 carbon atoms;
   (g) the copolymers of ethylene and a mono- or dialkylaminoalkyl methacrylate wherein the alkyl groups contain 1 to 5 carbon atoms;
   (h) the copolymers of styrene and a mono- or dialkylaminoalkyl methacrylate wherein the alkyl groups contain 1 to 5 carbon atoms;
   (i) water insoluble alkylbenzyl adducts of polyethyleneimine wherein the alkyl groups contain 6 to 20 carbon atoms;
   and (C) is selected from the group consisting of:
   (a) copolymers of ethylene and between 5 and 20 weight percent acrylic acid;
   (b) copolymers of ethylene between 5 and 20 weight percent methacrylic acid;
   (c) copolymers of ethylene and between 5 and 20 weight percent acrylic acid wherein the acid portion of said coplymer is fully or partially converted to a salt, the cation of said acid salt being a mono- or divalent metal from Group I or II of the Periodic Table;
   (d) copolymers of ethylene and between 5 and 20 weight percent methacrylic acid wherein the acid portion of said copolymer is fully or partially converted to a salt, the cation of said acid salt being a mono- or divalent metal from Group I or II of the Periodic Table.

7. The article defined in claim 6 wherein (A) is polypropylene, (B) is the reaction product of a 1:1 styrene-maleic anhydride copolymer with (dimethylamino)propylamine, and (C) is the copolymer of ethylene and between 5 and 20 weight percent acrylic acid.

8. The article defined in claim 6 wherein (A) is polypropylene, (B) is the reaction product of a 1:1 styrene-maleic anhydride copolymer with (dimethylamino)propylamine and (C) is the copolymer of ethylene and between 5 and 20 weight percent methacrylic acid.

9. The article defined in claim 6 wherein (A) is polypropylene, (B) is the reaction product of a 1:1 styrene-maleic anhydride copolymer with (dimethylamino)propylamine and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

10. The article defined in claim 6 wherein (A) is polypropylene, (B) is the reaction product of a 1:1 styrene-maleic anhydride copolymer with (dimethylamino)propylamine and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

11. The article defined in claim 6 wherein (A) is polypropylene, (B) is the reaction product of a 1:1 ethylene-maleic anhydride copolymer with (dimethylamino)propylamine, and (C) is the copolymer of ethylene and between 5 and 20 weight percent acrylic acid.

12. The article defined in claim 6 wherein (A) is polypropylene-maleic anhydride copolymer with (dimethylamino)propylamine and (C) is the copolymer of ethylene and between 5 and 20 weight percent methacrylic acid.

13. The article defined in claim 6 wherein (A) is polypropylene, (B) is the reaction product of a 1:1 ethylene-maleic anhydride copolymer with (dimethylamino)propylamine and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

14. The article defined in claim 6 wherein (A) is polypropylene, (B) is the reaction product of a 1:1 ethylene-maleic anhydride copolymer with (dimethylamino)propylamine and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

15. The article defined in claim 6 wherein (A) is polypropylene, (B) is the reaction product of N-methyl-bis-(aminopropylamine) with 2,4-tolylene diisocyanate, and (C) is the copolymer of ethylene and between 5 and 20 weight percent acrylic acid.

16. The article defined in claim 6 wherein (A) is polypropylene, (B) is the reaction product of N-methyl-bis-(aminopropylamine) with 2,4-tolylene diisocyanate and (C) is the copolymer of ethylene and between 5 and 20 weight percent methacrylic acid.

17. The article defined in claim 6 wherein (A) is polypropylene, (B) is the reaction product of N-methyl-bis-(aminopropylamine) with 2,4-tolylene diisocyanate, and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

18. The article defined in claim 6 wherein (A) is polypropylene, (B) is the reaction product of N-methyl-bis-(aminopropylamine) with 2,4 tolylene diisocyanate and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

19. The article defined in claim 6 wherein (A) is polypropylene, (B) is the reaction product of N-methyl-bis-(aminopropylamine) with adipic acid, and (C) is the copolymer of ethylene and between 5 and 20 weight percent acrylic acid.

20. The article defined in claim 6 wherein (A) is polypropylene, (B) is the reaction product of N-methyl-bis-(aminopropylamine) with adipic acid and (C) is the copolymer of ethylene and between 5 and 20 weight percent methacrylic acid.

21. The article defined in claim 6 wherein (A) is polypropylene, (B) is the reaction product of N-methyl-bis-(aminopropylamine) with adipic acid and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

22. The article defined in claim 6 wherein (A) is polypropylene, (B) is the reaction product of N-methyl-bis-(aminopropylamine) with adipic acid and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

23. The article defined in claim 6 wherein (A) is polypropylene, (B) is a copolymer of ethylene and dimethylaminoethyl acrylate, and (C) is the copolymer of ethylene and between 5 and 20 weight percent acrylic acid.

24. The article defined in claim 6 wherein (A) is polypropylene, (B) is a copolymer of ethylene and dimethylaminoethyl acrylate and (C) is the copolymer of ethylene and between 5 and 20 weight percent methacrylic acid.

25. The article defined in claim 6 wherein (A) is polypropylene, (B) is a copolymer of ethylene and dimethylaminoethyl acrylate, and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

26. The article defined in claim 6 wherein (A) is polypropylene, (B) is a copolymer of ethylene and dimethylaminoethyl acrylate and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

27. The article defined in claim 6 wherein (A) is polypropylene, (B) is a copolymer of styrene and dimethylaminoethyl acrylate, and (C) is the copolymer of ethylene and between 5 and 20 weight percent acrylic acid.

28. The article defined in claim 6 wherein (A) is polypropylene, (B) is a copolymer of styrene and dimethylamino ethyl acrylate and (C) is the copolymer of ethylene and between 5 and 20 weight percent methacrylic acid.

29. The article defined in claim 6 wherein (A) is polypropylene, (B) is a copolymer of styrene and dimethylaminoethyl acrylate and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

30. The article defined in claim 6 wherein (A) is polypropylene, (B) is a copolymer of styrene and dimethylaminoethyl acrylate and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

31. The article defined in claim 6 wherein (A) is polypropylene, (B) is copolymer of ethylene and dimethylaminoethyl methacrylate, and (C) is the copolymer of ethylene and between 5 and 20 weight percent acrylic acid.

32. The article defined in claim 6 wherein (A) is polypropylene, (B) is a copolymer of ethylene and dimethylaminoethyl methacrylate and (C) is the copolymer of ethylene and between 5 and 20 weight percent methacrylic acid.

33. The article defined in claim 6 wherein (A) is polypropylene, (B) is a copolymer of ethylene and dimethylaminoethyl methacrylate, and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

34. The article defined in claim 6 wherein (A) is polypropylene, (B) is a copolymer of ethylene and dimethylaminoethyl methacrylate, and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

35. The article defined in claim 6 wherein (A) is polypropylene, (B) is a copolymer of styrene and dimethylaminoethyl methacrylate, and (C) is the copolymer of ethylene and between 5 and 20 weight percent acrylic acid.

36. The article defined in claim 6 wherein (A) is polypropylene, (B) is a copolymer of styrene with dimethylaminoethyl methacrylate and (C) is the copolymer of ethylene and between 5 and 20 weight percent methacrylic acid.

37. The article defined in claim 6 wherein (A) is polypropylene, (B) is a copolymer of styrene with dimethylaminoethyl methacrylate, and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

38. The article defined in claim 6 wherein (A) is polypropylene, (B) is a copolymer of styrene and dimethylaminoethyl methacrylate, and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

39. The article defined in claim 6 wherein (A) is polypropylene, (B) is an alkylbenzyl adduct of polyethyleneimine wherein the alkyl groups contain 8 to 12 carbon atoms, and (C) is the copolymer of ethylene and between 5 and 20 weight percent acrylic acid.

40. The article defined in claim 6 wherein (A) is polypropylene, (B) is an alkylbenzyl adduct of polyethyleneimine wherein the alkyl groups contain 8 to 12 carbon atoms, and (C) is the copolymer of ethylene and between 5 and 20 weight percent methacrylic acid.

41. The article defined in claim 6 wherein (A) is polypropylene, (B) is an alkylbenzyl adduct of polyethyleneimine wherein the alkyl groups contain 8 to 12 carbon atoms, and (C) is a copolymer of ethylene and between 5 and 20 weight percent acrylic acid wherein the acid portion of said copolymer is fully or partially converted to a salt, the cation of said salt being selected from the group consisting of sodium, potassium, zinc or calcium.

42. The article defined in claim 6 wherein (A) is polypropylene, (B) is an alkylbenzyl adduct of polyethyleneimine wherein the alkyl groups contain 8 to 12 carbon atoms, and (C) is a copolymer of ethylene and between 5 and 20 weight percent methacrylic acid wherein the acid portion of said copolymer is fully or partially converted to a salt, the cation of said salt being selected from the group consisting of sodium, potassium, zinc or calcium.

References Cited

UNITED STATES PATENTS

| | | | |
|---|---|---|---|
| 3,037,835 | 6/1962 | Bonvicini et al. | 260—898 |
| 3,126,246 | 3/1964 | Cappuccio et al. | 8—115.5 |
| 3,163,492 | 12/1964 | Thomas | 8—115.5 |
| 3,215,487 | 11/1965 | Cappuccio et al. | 8—115.5 |
| 3,245,751 | 4/1966 | Bonvicini | 8—100 |
| 3,415,904 | 12/1968 | Taniguchi et al. | 8—115.5 |
| 3,527,846 | 9/1970 | Cappuccio et al. | 260—898 |
| 3,166,607 | 1/1965 | Cernia et al. | 8—165 |
| 3,337,652 | 8/1967 | Press | 8—168 |

FOREIGN PATENTS

| | | | |
|---|---|---|---|
| 87,132 | 3/1963 | India | 260—897 |

OTHER REFERENCES

Textile Technology Digest, vol. 23, No. 11, November 1966, abstr. 9037, Mitsubishi Rayon Co., "Polyproylene . . . Acid Dyes."

HAROLD D. ANDERSON, Primary Examiner

E. WOODBERRY, Assistant Examiner

U.S. Cl. X.R.

8—55, 115.5, 168.2, Digest 9; 260—873, 897 B